United States Patent
Kojima et al.

(10) Patent No.: US 10,212,439 B2
(45) Date of Patent: Feb. 19, 2019

(54) VIDEO PROCESSING APPARATUS AND METHOD FOR CONTROLLING VIDEO PROCESSING APPARATUS

(71) Applicant: SONY CORPORATION, Tokyo (JP)

(72) Inventors: Kentaro Kojima, Kanagawa (JP); Nobuhiro Chiba, Kanagawa (JP); Hiroaki Seto, Kanagawa (JP); Shusuke Ozawa, Kanagawa (JP); Junya Sato, Kanagawa (JP); Kyohei Koyabu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 85 days.

(21) Appl. No.: 15/305,404

(22) PCT Filed: Apr. 20, 2015

(86) PCT No.: PCT/JP2015/061938
§ 371 (c)(1),
(2) Date: Oct. 20, 2016

(87) PCT Pub. No.: WO2015/166825
PCT Pub. Date: Nov. 5, 2015

(65) Prior Publication Data
US 2017/0048535 A1    Feb. 16, 2017

(30) Foreign Application Priority Data
Apr. 28, 2014   (JP) .................................. 2014-092321

(51) Int. Cl.
*H04N 19/426* (2014.01)
*H04N 5/073* (2006.01)
*H04N 19/90* (2014.01)

(52) U.S. Cl.
CPC .......... *H04N 19/426* (2014.11); *H04N 5/073* (2013.01); *H04N 19/427* (2014.11); *H04N 19/90* (2014.11)

(58) Field of Classification Search
CPC .... H04N 19/426; H04N 19/427; H04N 19/90; H04N 5/073
See application file for complete search history.

(56) References Cited

U.S. PATENT DOCUMENTS 5,598,525 A * 1/1997 Nally .................... G06T 11/203
345/505
6,489,933 B1 * 12/2002 Ishibashi ................ G09G 5/363
345/1.1
(Continued)

FOREIGN PATENT DOCUMENTS

| JP | 9-116898 A | 5/1997 |
| WO | 2010/143654 A | 12/2010 |

OTHER PUBLICATIONS

International Search Report and the Written Opinion Received for PCT Application No. PCT/JP2015/061938, dated Jul. 14, 2016, p. 5.

*Primary Examiner* — Tat C Chio
(74) *Attorney, Agent, or Firm* — Chip Law Group (57) ABSTRACT

To achieve a reduction in circuit size without causing output leakage from a frame memory. A frame memory temporarily stores a plurality of input video signals. A plurality of encoders perform compression coding on the video signals read from the frame memory. A control unit controls the operations of writing into and reading from the frame memory. The video signals are written into the frame memory at respective frame frequencies. The video signals are read from the frame memory at a common output frame (Continued)

frequency. The output frame frequency is assumed to be the highest frame frequency or more of the video signals.

13 Claims, 6 Drawing Sheets

(56) References Cited

U.S. PATENT DOCUMENTS

| | | | |
|---|---|---|---|
| 9,854,263 B2* | 12/2017 | Newman | H04N 19/44 |
| 2005/0195899 A1* | 9/2005 | Han | H04N 21/234327 |
| | | | 375/240.21 |
| 2006/0238826 A1* | 10/2006 | Itou | H04N 7/181 |
| | | | 358/448 |
| 2009/0129746 A1* | 5/2009 | Isnardi | H04N 5/913 |
| | | | 386/252 |

* cited by examiner

VIDEO PROCESSING APPARATUS AND METHOD FOR CONTROLLING VIDEO PROCESSING APPARATUS

CROSS REFERENCE TO RELATED APPLICATIONS

This application is a U.S. National Phase of International Patent Application No. PCT/JP2015/061938 filed on Apr. 20, 2015, which claims priority benefit of Japanese Patent Application No. JP 2014-092321 filed in the Japan Patent Office on Apr. 28, 2014. Each of the above-referenced applications is hereby incorporated herein by reference in its entirety.

TECHNICAL FIELD

The present technology relates to a video processing apparatus and a method for controlling the video processing apparatus, and particularly to a video processing apparatus for handling a plurality of video signals input at any frame frequencies and frame phases.

BACKGROUND ART

It is conventionally known that a plurality of video signals input at any frame frequencies and frame phases are subjected to compression coding to be fetched into a storage device. The video signals are sent to the respective encoders via a frame memory. Writing into and reading from the frame memory are performed at respective timings. In this case, the encoders for performing compression coding on the video signals need to be supplied with a reference signal at independent timings, respectively, which causes an increase in circuit size.

For example, Patent Document 1 describes a technology which is configured by use of a frame memory and performs frame rate conversion assuming different output frame frequencies for input frame frequencies, respectively.

CITATION LIST

Patent Document

Patent Document 1: Japanese Patent Application Laid-Open No. 2006-303629

SUMMARY OF THE INVENTION

Problems to be Solved by the Invention

It is an object of the present technology to achieve a reduction in circuit size without causing output leakage from a frame memory.

Solutions to Problems

A concept of the present technology lies in a video processing apparatus including:
a frame memory for temporarily storing a plurality of input video signals;
a plurality of encoders for performing compression coding on the video signals read from the frame memory; and
a control unit for controlling operations of writing into and reading from the frame memory,
wherein the input video signals are written into the frame memory at respective frame frequencies,
the input video signals are read from the frame memory at a common output frame frequency, and
the output frame frequency is assumed to be the highest frame frequency or more of the input video signals.

According to the present technology, the input video signals are supplied to the encoders to be subjected to compression coding via the frame memory, respectively. The operations of writing into and reading from the frame memory are controlled by the control unit. The video signals are written into the frame memory at the respective frame frequencies. Further, the video signals are read from the frame memory at the common output frame frequency. In this case, the output frame frequency is assumed to be the highest frame frequency or more of the video signals. For example, there may be further provided an oscillator for generating a signal at the output frame frequency. Further, for example, there may be provided a port for inputting a signal at the output frame frequency.

As described above, according to the present technology, the video signals are read from the frame memory at the common output frame frequency and the encoders can be operated by one reference signal (synchronization signal), thereby achieving a reduction in circuit size. Further, the output frame frequency is assumed to be the highest frame frequency or more of the video signals, thereby avoiding output leakage from the frame memory from occurring.

Note that, in the present technology, a sync status unit for acquiring information on frame positions and line positions of the input video signals may further be provided, and the control unit may control writing into and reading from the frame memory on the basis of the information acquired by the sync status unit.

In this case, for example, the control unit may issue a write instruction for a next frame within a frame being written at a timing of the output frame frequency and may not issue a write instruction several times in the same frame for the respective input video signals. Further, in this case, for example, the control unit may issue a read instruction at a timing of the output frame frequency and may not issue a read instruction when reading exceeds writing for the respective input video signals.

Further, for example, the present technology may be configured such that the control unit has a first queue for saving write instructions into the frame memory and a second queue for saving read instructions from the frame memory for the respective input video signals.

Further, in the present technology, for example, the encoders may stop the compression coding operation in an output frame period in which a video signal is not read from the frame memory. In this case, for example, the encoders may be supplied with a disable signal to stop the compression coding operation in the output frame period in which the compression coding operation is stopped. Further, in this case, for example, the encoders may stop being supplied with a reference signal to stop the compression coding operation in the output frame period in which the compression coding operation is stopped.

Effects of the Invention

According to the present technology, it is possible to achieve a reduction in circuit size without causing output leakage from the frame memory. Note that the effects described in the present specification are merely exemplary, and additional effects may be provided.

MODE FOR CARRYING OUT THE INVENTION

Modes for carrying out the invention (which will be denoted as "embodiments" below) will be described below. Note that the description will be made in the following order.
1. First Embodiment
2. Second Embodiment
3. Variant 1. First Embodiment

[Configuration of Video Processing Apparatus]

Figure 1:
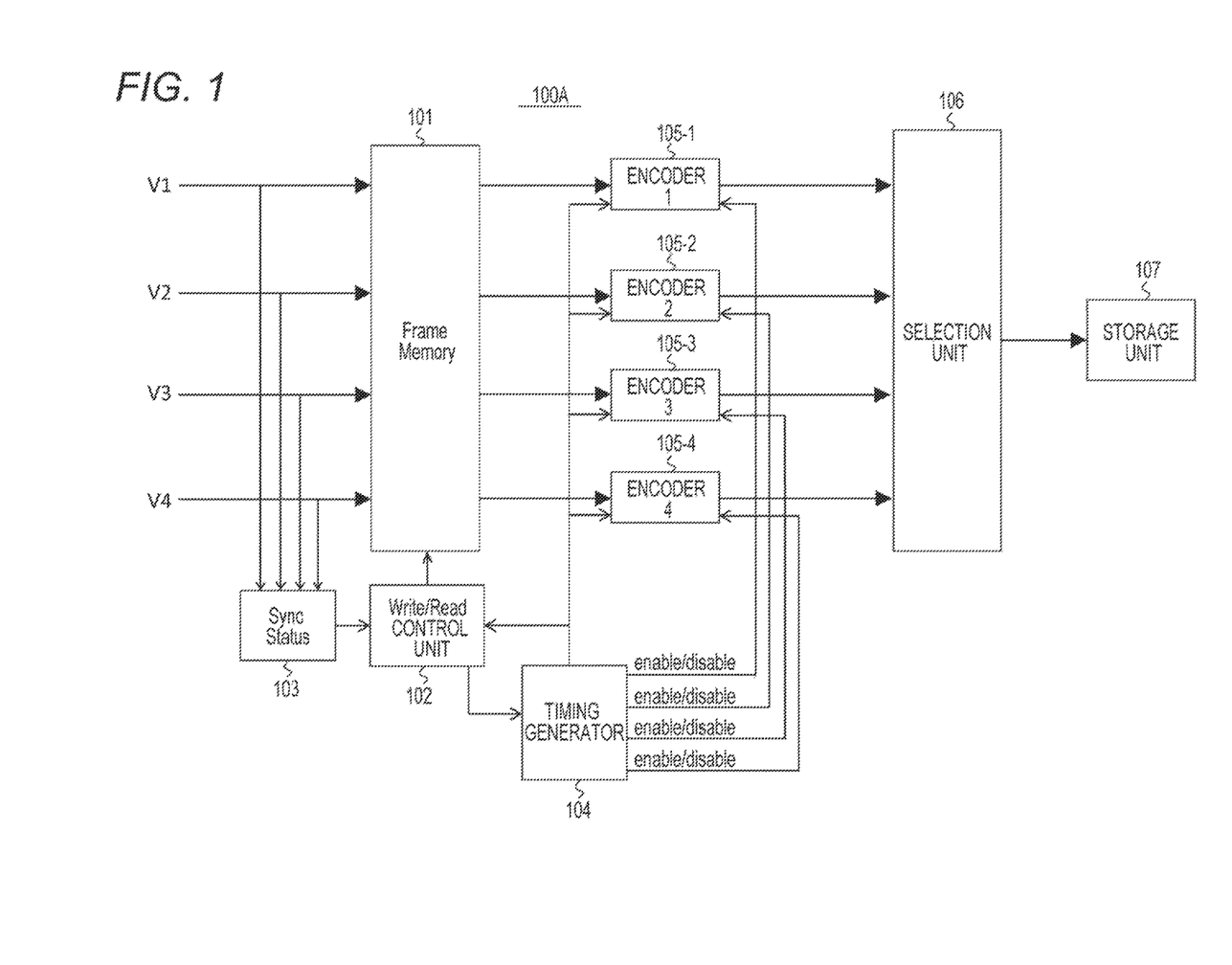
FIG. 1 is a block diagram illustrating an exemplary configuration of a video processing apparatus according to a first embodiment.

FIG. 1 illustrates an exemplary configuration of a video processing apparatus 100 according to a first embodiment. The video processing apparatus 100 performs a processing of performing compression coding on a plurality of, or four input video signals V1 to V4 input at any frame frequencies and frame phases and fetching them into a storage device. The video processing apparatus 100 has a frame memory 101, a Write/Read control unit 102, a sync status unit 103, a timing generator 104, encoders 105-1 to 105-4, a selection unit 106, and a storage device 107.

The frame memory 101 temporarily stores the input video signals V1 to V4. The input video signals V1 to V4 are of shooting output of a camera, reproduction output of a video cassette recorder, or the like. The Write/Read control unit 102 controls writing into and reading from the frame memory 101. The timing generator 104 generates and supplies a reference signal (synchronization signal) to the Write/Read control unit 102 and the encoders 105-1 to 105-4.

The sync status unit 103 monitors the frame positions and the line positions of the respective input video signals V1 to V4, and supplies the monitoring information to the Write/Read control unit 102. The Write/Read control unit 102 controls writing into and reading from the frame memory 101 on the basis of the reference signal or the monitoring information.

The input video signals V1 to V4 are written into the frame memory 101 at respective frame frequencies. Further, the input video signals V1 to v4 are read from the frame memory 101 at a common output frame frequency. Herein, the output frame frequency is assumed to be the highest frame frequency or more of the input video signals V1 to V4. For example, when 50 Hz and 60 Hz are present together as the frame frequencies of the input video signals V1 to V4, the output frame frequency is assumed to be 60 Hz or more.

The Write/Read control unit 102 issues an instruction to write a next frame within a current frame being written at a timing of the output frame frequency for the input video signals V1 to V4. Further, the Write/Read control unit 102 issues a write instruction in the same frame only once, or does not issue a write instruction several times in the same frame. The Write/Read control unit 102 can determine whether a write instruction is in the same frame on the basis of the monitoring information from the sync status unit 103.

Figure 2:
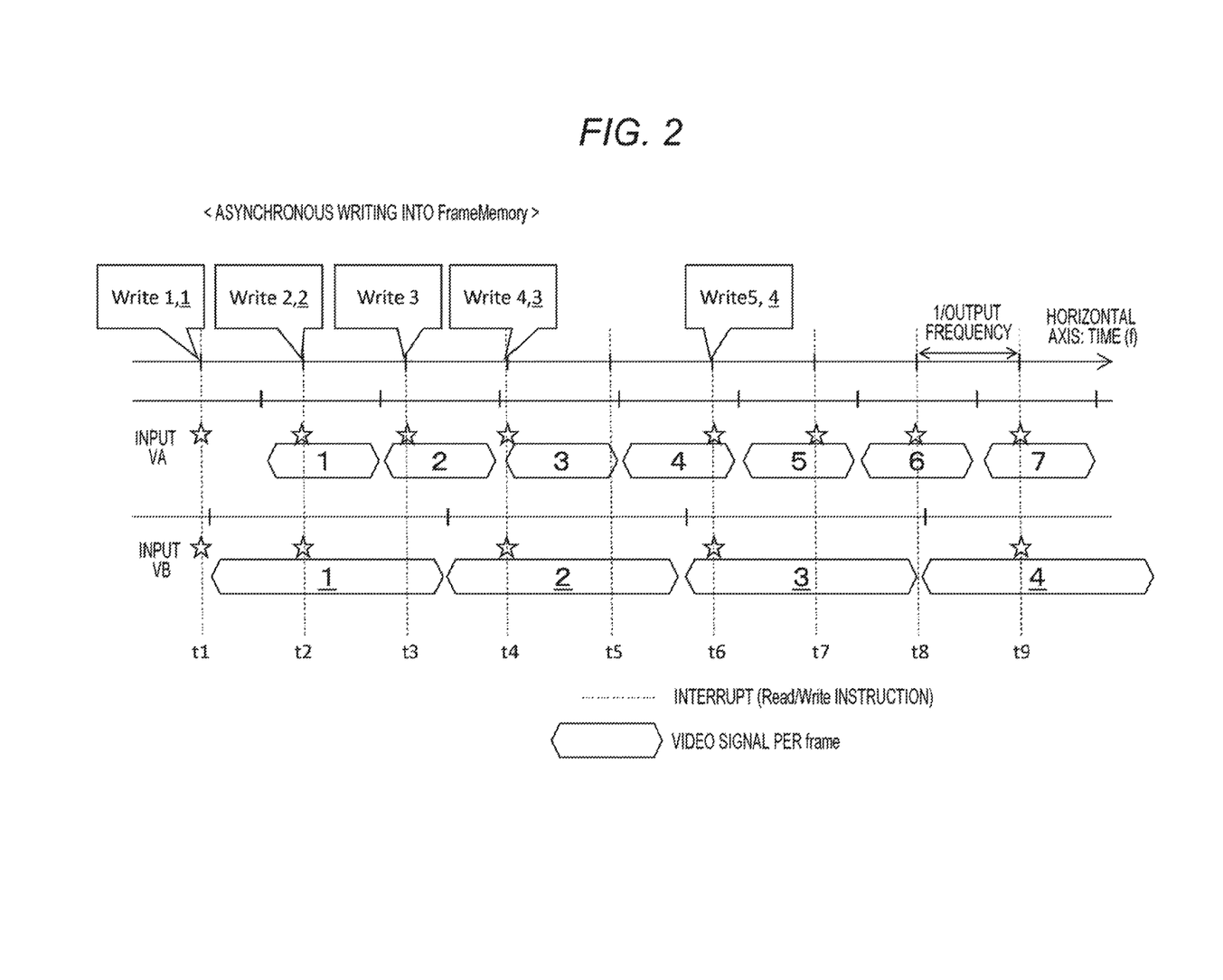
FIG. 2 is a diagram illustrating an exemplary operation of asynchronously writing into a frame memory.

FIG. 2 illustrates an exemplary operation of asynchronously writing into the frame memory 101. There will be described herein, for simplified description, an example in which two input video signals VA and VB at different frame frequencies and frame phases are handled. Further, this example assumes that write instructions not attached with an underscored number are for the input video signal VA and write instructions attached with an underscored number are for the input video signal VB. Further, stars indicate a timing of issuing a write instruction for the input video signals VA and VB.

A write operation for the input video signal VA will be first described. The Write/Read control unit 102 issues a write instruction "Write 1" to the frame memory 101 at timing t1 of the output frame frequency before being input with a frame 1. The frame 1 is written into the frame memory 101 in response to the write instruction "Write 1" at its top of frame timing and at a frame frequency of the input video signal VA.

The Write/Read control unit 102 issues a write instruction "Write 2" for a next frame 2 to the frame memory 101 at timing t2 of the next output frame frequency. Timing t2 is within the period of the frame 1. When the frame 1 is completely written, the frame 2 is written into the frame memory 101 in response to the write instruction "Write 2" at its top of frame timing and at the frame frequency of the input video signal VA. A similar operation will be performed below.

A write operation for the input video signal VB will be described below. The Write/Read control unit 102 issues a write instruction "Write 1" to the frame memory 101 at timing t1 of the output frame frequency immediately before being input with a frame 1. The frame 1 is written into the frame memory 101 in response to the write instruction "Write 1" at its top of frame timing and at a frame frequency of the input video signal VB.

The Write/Read control unit 102 issues a write instruction "Write 2" for a next frame 2 to the frame memory 101 at timing t2 of the next output frame frequency. Timing t2 is within the period of the frame 1. Further, the Write/Read control unit 102 does not issue a write instruction for the next frame 2 to the frame memory 101 at timing t3 of the next output frame frequency. When the frame 1 is completely written, the frame 2 is written into the frame memory 101 in response to the write instruction "Write 2" at its top of frame timing and at the frame frequency of the input video signal VA. A similar operation will be performed below.

Returning to FIG. 1, the Write/Read control unit 102 issues a read instruction at a timing of the output frame frequency for the input video signals V1 to V4. Further, the Write/Read control unit 102 does not issue a read instruction when reading exceeds writing. The Write/Read control unit 102 can determine whether reading exceeds writing on the basis of a difference between the input and output frame frequencies and the monitoring information from the sync status unit 103.

Figure 3:
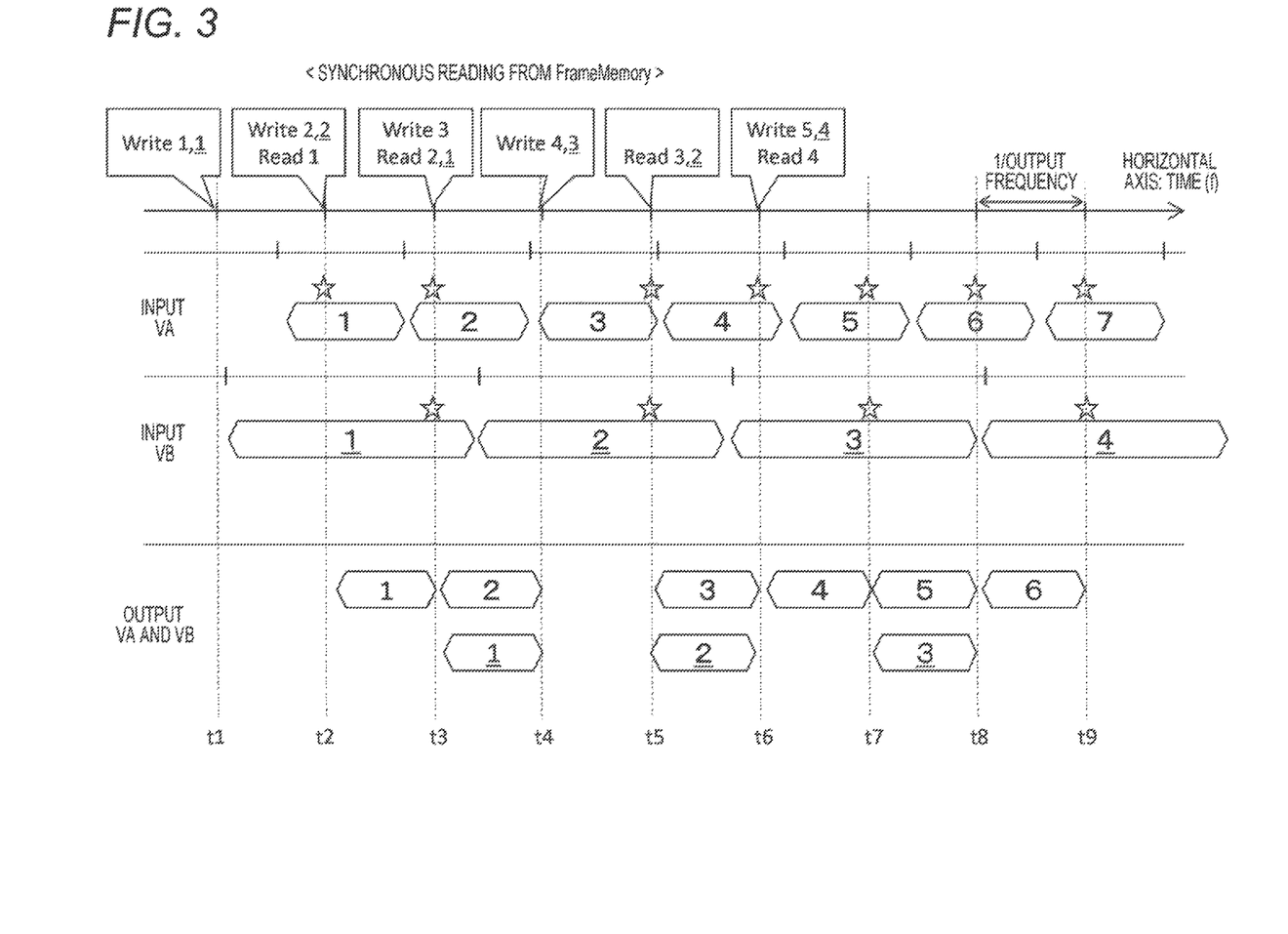
FIG. 3 is a diagram illustrating an exemplary operation of synchronously reading from the frame memory.

FIG. 3 illustrates an exemplary operation of synchronously reading from the frame memory 101. Similarly as in FIG. 2, there will be described herein, for simplified description, an example in which the two input video signals VA and VB at different frame frequencies and frame phases are handled. Further, this example assumes that read instructions not attached with an underscored number are for the input video signal VA and read instructions attached with an underscored number are for the input video signal VB. Further, stars indicate a timing of issuing a read instruction for the input video signals VA and VB.

A read operation for the input video signal VA will be first described. The Write/Read control unit 102 issues a read instruction "Read 1" to the frame memory 101 at timing t2 of the output frame frequency after the frame 1 starts being written. The frame 1 is read from the frame memory 101 in response to the read instruction "Read 1" at the output frame frequency. The Write/Read control unit 102 issues a read instruction "Read 2" to the frame memory 101 at timing t3 of the next output frame frequency. The frame 2 is read from the frame memory 101 in response to the read instruction "Read 2" at the output frame frequency.

The Write/Read control unit 102 does not issue a read instruction to the frame memory 101 at timing t4 of the next output frame frequency. This is because when the frame 3 starts being read at timing t4, reading exceeds writing. The Write/Read control unit 102 issues a read instruction "Read 3" to the frame memory 101 at timing t5 of the next output frame frequency. The frame 3 is read from the frame memory 101 in response to the read instruction "Read 3" at the output frame frequency. A similar operation will be performed below.

A read operation for the input video signal VB will be described below. The Write/Read control unit 102 does not issue a read instruction to the frame memory 101 at timing t2 of the output frame frequency after the frame 1 starts being written. This is because when the frame 1 starts being read at timing t2, reading exceeds writing. The Write/Read control unit 102 issues a read instruction "Read 1" to the frame memory 101 at timing t3 of the next output frame frequency. The frame 1 is read from the frame memory 101 in response to the read instruction "Read 1" at the output frame frequency.

A read instruction is not issued to the frame memory 101 at timing t4 of the next output frame frequency. This is because when the frame 2 starts being read at timing t2, reading exceeds writing. The Write/Read control unit 102 issues a read instruction "Read 2" to the frame memory 101 at timing t5 of the next output frame frequency. The frame 2 is read from the frame memory 101 in response to the read instruction"Read 2" at the output frame frequency. A similar operation will be performed below.

Returning to FIG. 1, the encoders 105-1 to 105-4 perform compression coding on the input video signals V1 to V4 read from the frame memory 101, respectively. As described above, the output frame frequency is assumed to be the highest frame frequency or more of the input video signals V1 to V4, and thus a frame in which any of the input video signals V1 to V4 is not read from the frame memory 101 is also present. The encoders 105-1 to 105-4 stop the compression coding operation in a frame period in which the input video signals V1 to V4 are not read from the frame memory 101.

For example, the encoders 105-1 to 105-4 are prepared with a mechanism for receiving an enable/disable signal. In a frame period in which a video signal is not read from the frame memory 101, a disable signal is supplied from the timing generator 104 to stop the compression coding operation, for example.

The selection unit 106 sends the input video signals V1 to V4 subjected to compression coding in the encoders 105-1 to 105-4 to the storage device 107 in a time division manner to be stored in the storage device 107. The recording device 107 is HDD or semiconductor memory, for example.

The operations of the video processing apparatus 100 illustrated in FIG. 1 will be briefly described. The input video signals V1 to V4 are input into the frame memory 101 and into the sync status unit 103. The frame positions and the line positions of the respective input video signals V1 to V4 are monitored in the sync status unit 103, and the monitoring information is supplied to the Write/Read control unit 102. Further, a reference signal (synchronization signal) is generated in the timing generation unit 104 to be supplied to the Write/Read control unit 102 and the encoders 105-1 to 105-4.

The operations of writing into and reading from the frame memory 101 are controlled by the Write/Read control unit 102 in response to the reference signal supplied from the timing generator 104 or the monitoring information supplied from the sync status unit 103. The input video signals V1 to V4 are written into the frame memory 101 at the respective frame frequencies. Further, the input video signals V1 to V4 are read from the frame memory 101 at the common output frame frequency. It is assumed herein that the output frame frequency is the highest frame frequency or more of the input video signals V1 to V4.

The input video signals V1 to V4 read from the frame memory 101 are supplied to the encoders 105-1 to 105-4 to be subjected to compression coding, respectively. The encoders 105-1 to 105-4 are supplied with a disable signal from the timing generator 104, for example, and stop the compression coding operation in a frame period in which the input video signals V1 to V4 are not read from the frame memory 101. The input video signals V1 to V4 subjected to compression coding in the encoders 105-1 to 105-4 are supplied to the selection unit 106. The compression-coded input video signals V1 to V4 are sent to and stored in the storage device 107 by the selection unit 106 in a time division manner.

As described above, in the video processing apparatus 100 illustrated in FIG. 1, the input video signals V1 to V4 are read from the frame memory 101 at a common output frame frequency. Therefore, the encoders 105-1 to 105-4 can be operated by one reference signal, thereby achieving a reduction in circuit size.

Further, in the video processing apparatus 100 illustrated in FIG. 1, the output frame frequency is assumed to be the highest frame frequency or more of the video signals. Therefore, it is possible to avoid output leakage from the frame memory 101 from occurring.

2. Second Embodiment

[Configuration of Video Processing Apparatus]

Figure 4:
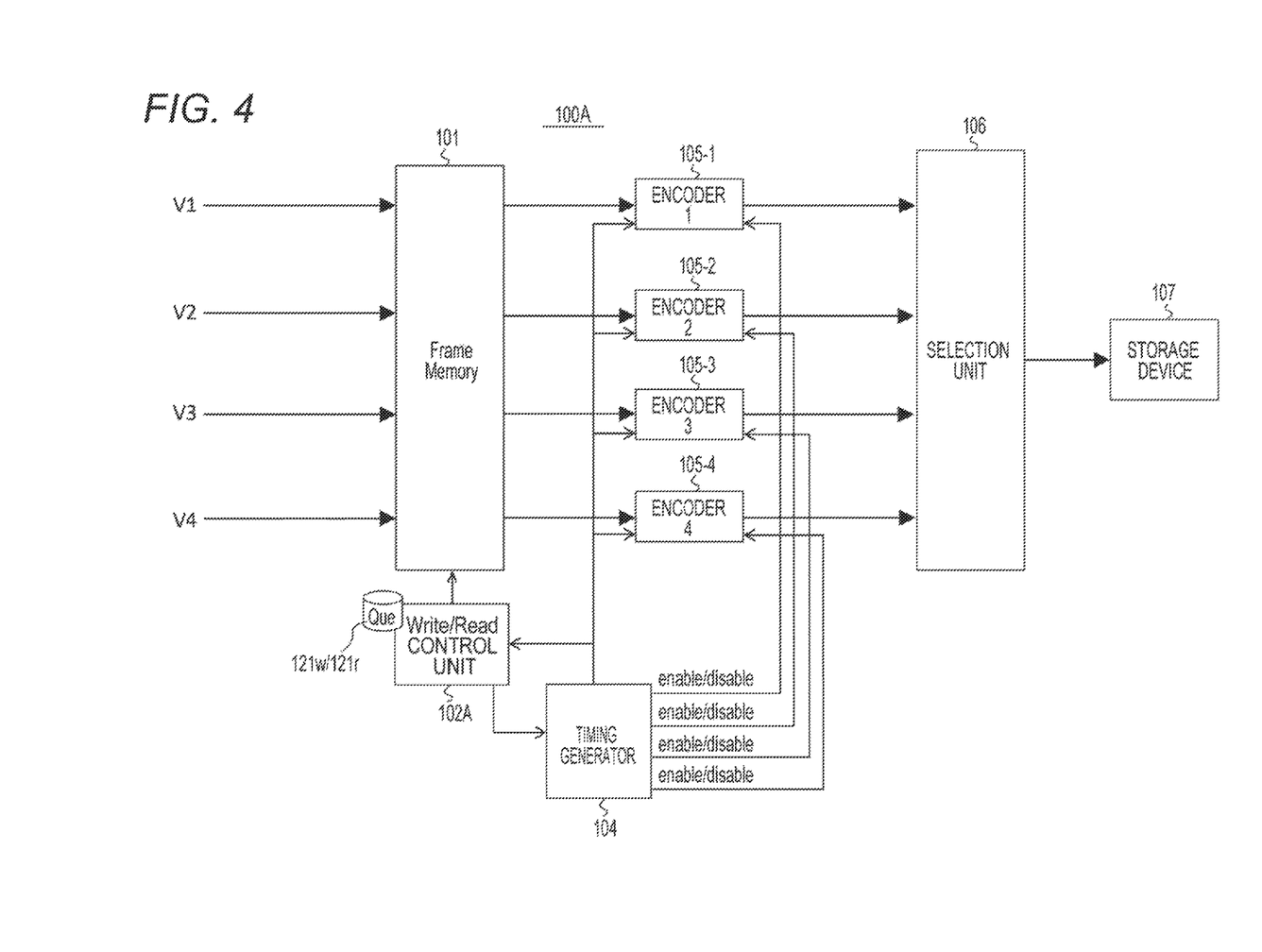
FIG. 4 is a block diagram illustrating an exemplary configuration of a video processing apparatus according to a second embodiment.

FIG. 4 illustrates an exemplary configuration of a video processing apparatus 100A according to a second embodiment. The video processing apparatus 100A performs the processing of performing compression coding on a plurality of, or four input video signals V1 to V4 input at any frame frequencies and frame phases and fetching them into a storage device similarly to the video processing apparatus 100 illustrated in FIG. 1. In FIG. 4, the parts corresponding to those in FIG. 1 are denoted with the same reference numerals and a detailed description thereof will be omitted as needed.

The video processing apparatus 100A has the frame memory 101, a Write/Read control unit 102A, the timing generator 104, the encoders 105-1 to 105-4, the selection unit 106, and the storage device 107. The frame memory 101 temporarily stores the input video signals V1 to V4. The input video signals V1 to V4 are of shooting output of a camera, reproduction output of a video cassette recorder, or the like, for example. The Write/Read control unit 102A controls writing into and reading from the frame memory 101.

The timing generator 104 generates and supplies a reference signal (synchronization signal) to the Write/Read control unit 102 and the encoders 105-1 to 105-4. The Write/Read control unit 102 controls writing into and reading from the frame memory 101 on the basis of the reference signal. The Write/Read control unit 102A has a Write Que 121$w$ for saving write instructions to be thrown to the frame memory 101 and a Read Que 121$r$ for saving read instructions to be thrown to the frame memory 101 for the respective input video signals V1 to V4.

The input video signals V1 to V4 are written into the frame memory 101 at respective frame frequencies. Further, the input video signals V1 to V4 are read from the frame memory 101 at a common output frame frequency. Herein, the output frame frequency is assumed to be the highest frame frequency or more of the input video signals V1 to V4. For example, when 50 Hz and 60 Hz are present together as the frame frequencies of the input video signals V1 to V4, the output frame frequency is assumed to be 60 Hz or more.

The Write/Read control unit 102A saves a predetermined number of write instructions in the Write Que 121$w$ for the respective input video signals V1 to V4, and throws the write instructions saved in the Write Que 121$w$ to the frame memory 101. When writing in response to a write instruction is terminated, the Write/Read control unit 102A subtracts one write instruction from the Write Que 121$w$ and throws a next write instruction to the frame memory 101. Further, the Write/Read control unit 102A restocks the Write Que 121$w$ with write instructions at an appropriate frequency.

Figure 5:
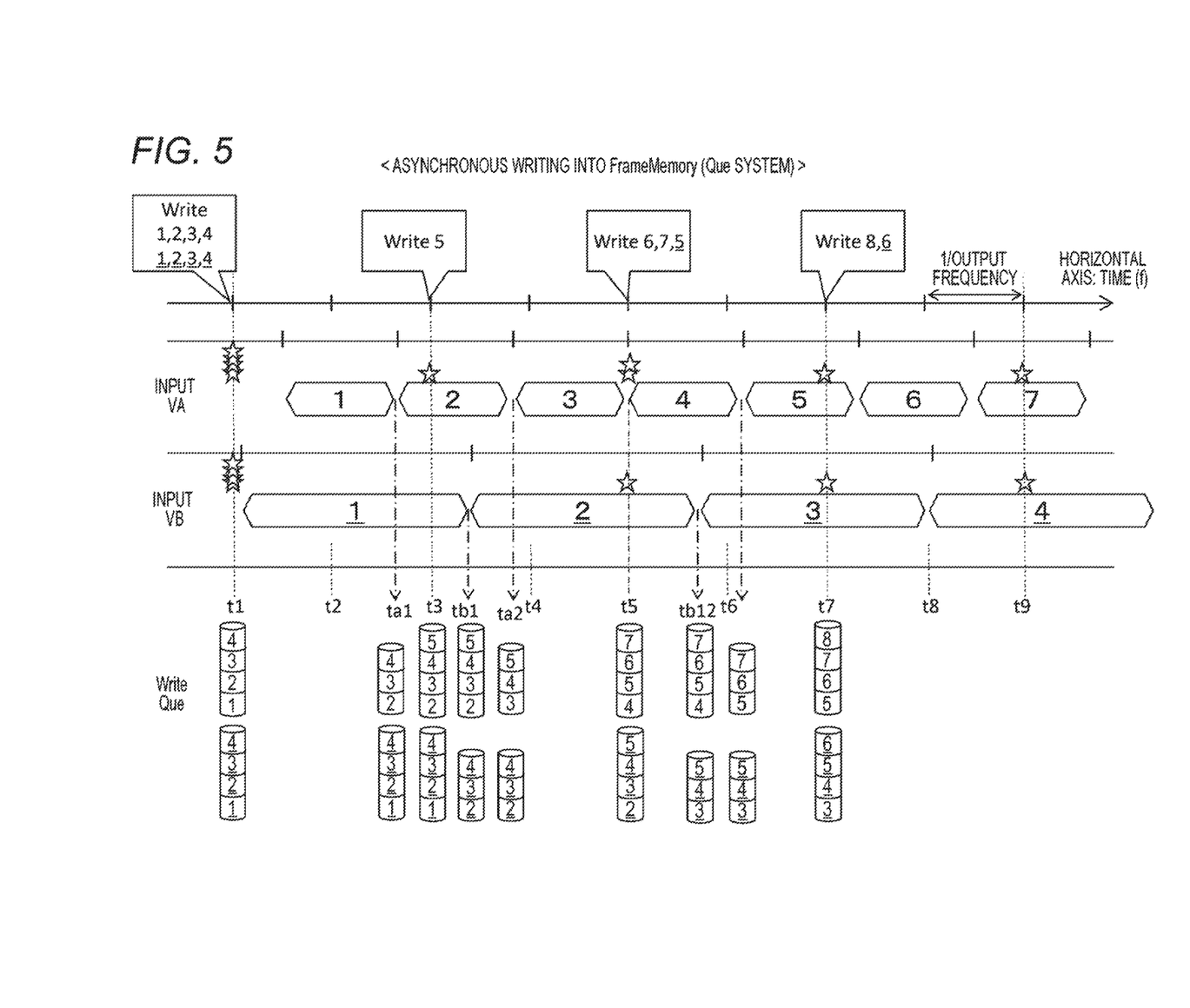
FIG. 5 is a diagram illustrating an operation of asynchronously writing into the frame memory (Que system).

FIG. 5 illustrates an exemplary operation of asynchronously writing into the frame memory 101. There will be described herein, for simplified description, an example in which two input video signals VA and VB at different frame frequencies and frame phases are handled. Further, this example assumes that write instructions not attached with an underscored number are for the input video signal VA and write instructions attached with an underscored number are for the input video signal VB. Further, stars indicate a timing of issuing a write instruction for the input video signals VA and VB.

A write operation for the input video signal VA will be first described. The Write/Read control unit 102A saves a predetermined number of, or four write instructions "Write 1," "Write 2," "Write 3," and "Write 4" in the Write Que at timing t1 of the output frame frequency before being input with a frame 1. Thereafter, the head write instruction "Write 1" in the Write Que 121$w$ is thrown to the frame memory 101. The frame 1 is written into the frame memory 101 in response to the write instruction "Write 1" at its top of frame timing and at a frame frequency of the input video signal VA.

The write instruction "Write 1" is removed from the Write Que 121$w$ at timing ta1 when the frame 1 is completely written, and the next write instruction "Write 2" is thrown to the frame memory 101. A frame 2 is written into the frame memory 101 in response to the write instruction "Write 2" at its top of frame timing and at the frame frequency of the input video signal VA. Thereafter, a write instruction "Write 5" is restocked in the Write Que 121$w$ at timing t3 of the output frame frequency. A similar operation will be performed below.

A read operation for the input video signal VB will be described below. The Write/Read control unit 102A saves a predetermined number of, or four write instructions "Write 1," "Write 2," "Write 3," and "Write 4" in the Write Que at timing t1 of the output frame frequency before being input with a frame 1. Thereafter, the head write instruction "Write 1" in the Write Que 121$w$ is thrown to the frame memory 101. The frame 1 is written into the frame memory 101 in response to the write instruction "Write 1" at its top of frame timing and at a frame frequency of the input video signal VB.

The write instruction "Write 1" is removed from the Write Que 121$w$ at timing tb1 when the frame 1 is completely written, and the next write instruction "Write 2" is thrown to the frame memory 101. A frame 2 is written into the frame memory 101 in response to the write instruction "Write 2" at its top of frame timing and at the frame frequency of the input video signal VB. Thereafter, a write instruction "Write 5" is restocked in the Write Que 121$w$ at timing t5 of the output frame frequency. A similar operation will be performed below.

Returning to FIG. 4, the Write/Read control unit 102A saves a predetermined number of read instructions in the Read Que 121$r$ for the respective input video signals V1 to V4, and throws the read instructions saved in the Read Que 121$r$ to the frame memory 101. When reading in response to a read instruction is terminated, the Write/Read control unit 102A subtracts one read instruction from the Read Que 121$r$, and then throws a next read instruction to the frame memory 101. Further, the Write/Read control unit 102A restocks the Read Que 121$r$ with read instructions at an appropriate frequency. Note that, in this case, only the read instructions of the frames written into the frame memory 101 are saved in the Read Que 121$r$ in order to prevent reading from exceeding writing.

Figure 6:
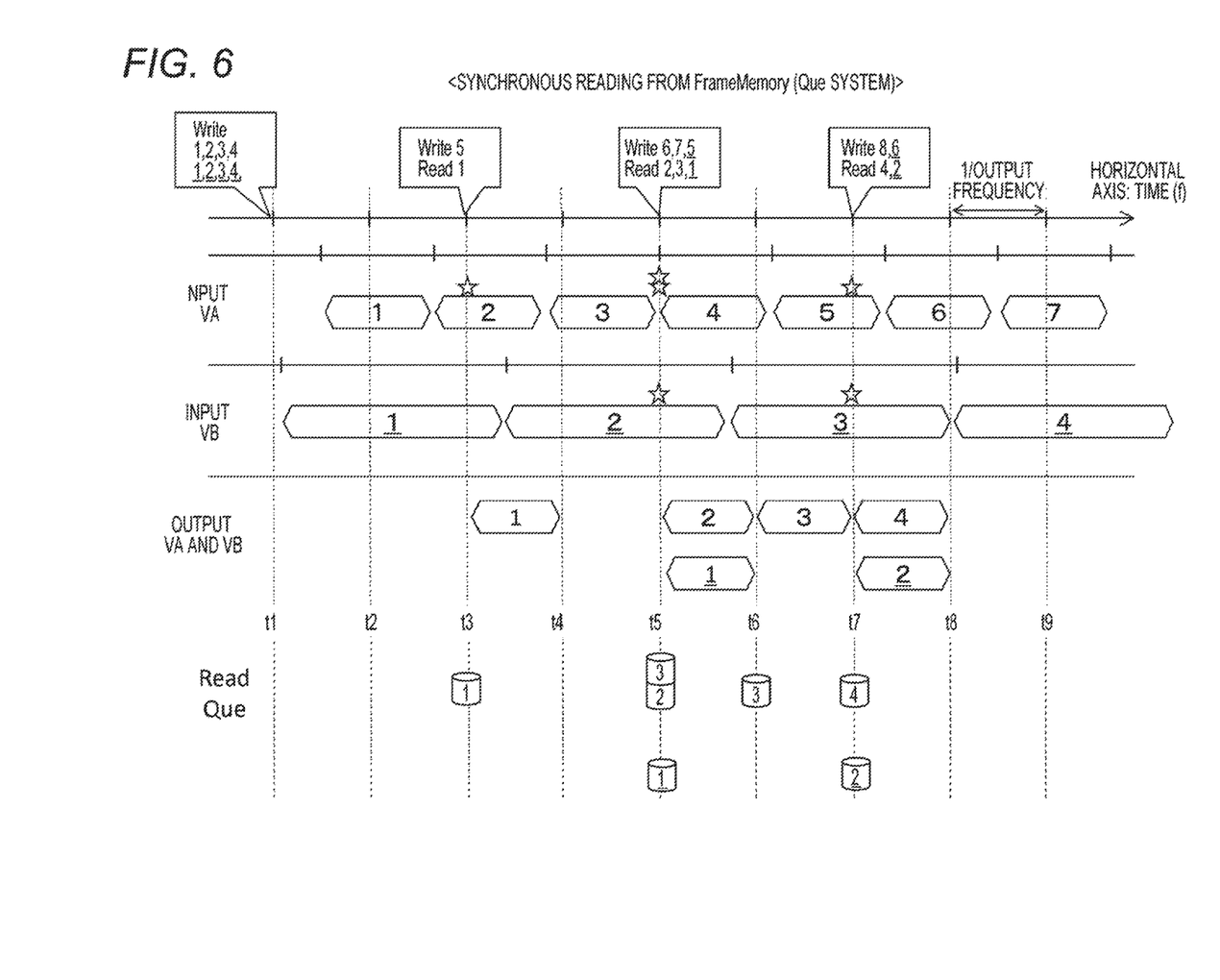
FIG. 6 is a diagram illustrating an exemplary operation of synchronously reading from the frame memory (Que system).

FIG. 6 illustrates an exemplary operation of synchronously reading from the frame memory 101. Similarly as in FIG. 5, there will be described herein, for simplified description, an example in which two input video signals VA and VB at different frame frequencies and frame phases are handled. Further, this example assumes that read instructions not attached with an underscored number are for the input video signal VA and read instructions attached with an underscored number are for the input video signal VB. Further, stars indicate a timing of issuing a read instruction for the input video signals VA and VB.

A read operation for the input video signal VA will be first described. The Write/Read control unit 102A saves a predetermined number of, or one read instruction "Read 1" in the Read Que 121$r$ at timing t3 of the output frame frequency while the frame 2 is being written. Thereafter, the head write instruction "Read 1" in the Read Que 121$r$ is thrown to the frame memory 101. The frame 1 is read from the frame memory 101 in response to the read instruction "Read 1" at the output frame frequency. The read instruction "Read 1" is removed from the Read Que 121$r$ at timing t4 when the frame 1 is completely read.

Thereafter, the Write/Read control unit 102A saves a predetermined number of, or two read instructions "Read 2" and "Read 3" in the Read Que 121r at timing t5 of the output frame frequency after the frame 3 is completely written. Thereafter, the head read instruction "Read 2" in the Read Que 121r is thrown to the frame memory 101. The frame 2 is read from the frame memory 101 in response to the read instruction "Read 2" at the output frame frequency.

The read instruction "Read 2" is removed from the Read Que 121r at timing t6 when the frame 2 is completely read. Thereafter, the head read instruction "Read 3" in the Read Que 121r is thrown to the frame memory 101. The frame 3 is read from the frame memory 101 in response to the read instruction "Read 3" at the output frame frequency. A similar operation will be performed below.

A read operation for the input video signal VB will be described below. The Write/Read control unit 102A saves a predetermined number of, or one read instruction "Read 1" in the Read Que 121r at timing t5 of the output frame frequency while the frame 2 is being written. Thereafter, the head write instruction "Read 1" in the Read Que 121r is thrown to the frame memory 101. The frame 1 is read from the frame memory 101 in response to the read instruction "Read 1" at the output frame frequency. The read instruction "Read 1" is removed from the Read Que 121r at timing t6 when the frame 1 is completely read.

Thereafter, the Write/Read control unit 102A saves a predetermined number of, or one read instruction "Read 2" in the Read Que 121r at timing t7 of the output frame frequency while the frame 3 is being written. Thereafter, the head read instruction "Read 2" in the Read Que 121r is thrown to the frame memory 101. The frame 2 is read from the frame memory 101 in response to the read instruction "Read 2" at the output frame frequency. A similar operation will be performed below.

Returning to FIG. 4, the encoders 105-1 to 105-4 perform compression coding on the input video signals V1 to V4 read from the frame memory 101, respectively. As described above, the output frame frequency is assumed to be the highest frame frequency or more of the input video signals V1 to V4, and thus a frame in which any of the input video signals V1 to V4 is not read from the frame memory 101 is also present. The encoders 105-1 to 105-4 stop the compression coding operation in a frame period in which the input video signals V1 to V4 are not read from the frame memory 101, respectively.

For example, the encoders 105-1 to 105-4 are prepared with a mechanism for receiving an enable/disable signal. In a frame period in which a video signal is not read from the frame memory, a disable signal is supplied from the timing generator 104 to stop the compression coding operation, for example.

The selection unit 106 sends the input video signals V1 to V4 subjected to compression coding in the encoders 105-1 to 105-4 to the storage device 107 in a time division manner to be stored in the storage device 107. The recording device 107 is HDD or semiconductor memory, for example.

The operations of the video processing apparatus 100A illustrated in FIG. 4 will be briefly described. The input video signals V1 to V4 are input into the frame memory 101. A reference signal (synchronization signal) is generated in the timing generation unit 104 and supplied to the Write/Read control unit 102A and the encoders 105-1 to 105-4, for example.

The operations of writing into and reading from the frame memory 101 are controlled by the Write/Read control unit 102A in response to the reference signal supplied from the timing generator 104. The input video signals V1 to V4 are written into the frame memory 101 at the respective frame frequencies. Further, the input video signals V1 to V4 are read from the frame memory 101 at the common output frame frequency. It is assumed herein that the output frame frequency is the highest frame frequency or more of the input video signals V1 to V4.

The input video signals V1 to V4 read from the frame memory 101 are supplied to the encoders 105-1 to 105-4 to be subjected to compression coding, respectively. The encoders 105-1 to 105-4 are supplied with a disable signal from the timing generator 104, for example, and stop the compression coding operation in a frame period in which the input video signals V1 to V4 are not read from the frame memory 101. The input video signals V1 to V4 subjected to compression coding in the encoders 105-1 to 105-4 are supplied to the selection unit 106. The compression-coded input video signals V1 to V4 are sent to and stored in the storage device 107 in a time division manner by the selection unit 106.

As described above, in the video processing apparatus 100A illustrated in FIG. 4, the input video signals V1 to V4 are read from the frame memory 101 at a common output frame frequency. Therefore, the encoders 105-1 to 105-4 can be operated by one reference signal, thereby achieving a reduction in circuit size.

Further, in the video processing apparatus 100A illustrated in FIG. 4, the output frame frequency is assumed to be the highest frame frequency or more of the video signals. Therefore, it is possible to avoid output leakage from the frame memory 101 from occurring.

3. Variant

Note that, according to the above embodiments, the encoders 105-1 to 105-4 are prepared with a mechanism for receiving an enable/disable signal. In a frame period in which a video signal is not read from the frame memory 101, a disable signal is supplied from the timing generator 104 to stop the compression coding operation, for example. Apart from this, it may be assumed that a reference signal (synchronization signal) stops being supplied from the timing generator 104 to the encoders 105-1 to 105-4 to stop the compression coding operation, for example, in a frame period in which a video signal is not read from the frame memory 101.

Further, the examples using four input video signals have been described above according to the embodiments, but the present technology is not limited thereto and can be similarly applied to any number of input video signals.

The above embodiments have described the examples in which a signal at an output frame frequency is generated by the timing generator 104, but a configuration in which the output frame frequency is given from outside may be assumed. In this case, the video processing apparatuses 100 and 100A include a port for inputting a signal at the output frame frequency.

Further, the present technology may employ the following configurations.

(1) A video processing apparatus including:
   a frame memory for temporarily storing a plurality of input video signals;
   a plurality of encoders for performing compression coding on the video signals read from the frame memory; and
   a control unit for controlling operations of writing into and reading from the frame memory, wherein the input video signals are written into the frame memory at respective frame frequencies,
the input video signals are read from the frame memory at a common output frame frequency, and
the output frame frequency is assumed to be the highest frame frequency or more of the input video signals.

(2) The video processing apparatus according to (1), further including:
a sync status unit for monitoring frame positions and line positions of the input video signals, respectively,
wherein the control unit controls writing into and reading from the frame memory on the basis of monitoring information of the sync status unit.

(3) The video processing apparatus according to (2), wherein the control unit issues a write instruction for a next frame within a frame being written at a timing of the output frame frequency and does not issue a write instruction several times in the same frame for the respective input video signals.

(4) The video processing apparatus according to (2) or (3), wherein the control unit issues a read instruction at a timing of the output frame frequency and does not issue a read instruction when reading exceeds writing for the respective input video signals.

(5) The video processing apparatus according to any of (1) to (4), wherein the encoders stop the compression coding operation in an output frame period in which a video signal is not read from the frame memory.

(6) The video processing apparatus according to (5), wherein the encoders are supplied with a disable signal to stop the compression coding operation in the output frame period in which the compression coding operation is stopped.

(7) The video processing apparatus according to (5), wherein the encoders stop being supplied with a reference signal to stop the compression coding operation in the output frame period in which the compression coding operation is stopped.

(8) The video processing apparatus according to any of (1) to (7), further including:
an oscillator for generating a signal at the output frame frequency.

(9) The video processing apparatus according to any of (1) to (7), further including:
a port for inputting a signal at the output frame frequency.

(10) The video processing apparatus according to (1), wherein the control unit has, for the respective input video signals:
a first que for saving write instructions to be thrown to the frame memory; and
a second que for saving read instructions to be thrown to the frame memory.

(11) A method for controlling a video processing apparatus including a frame memory for temporarily storing a plurality of input video signals, and a plurality of encoders for performing compression coding on the video signals read from the frame memory, the method including the steps of:
writing the input video signals into the frame memory at respective frame frequencies;
reading the input video signals from the frame memory at a common output frame frequency; and
assuming the output frame frequency to be the highest frame frequency or more of the input video signals.

REFERENCE SIGNS LIST 100, 100A Video processing apparatus
101 Frame memory
102, 102A Write/Read control unit
103 Sync status unit
104 Timing generator
105-1 to 105-4 Encoder
106 Selection unit
107 Storage device

The invention claimed is:
1. A video processing apparatus comprising:
a frame memory configured to temporarily store a plurality of input video signals;
a control unit configured to:
write the plurality of input video signals into the frame memory at respective frame frequencies of the plurality of input video signals; and
read the plurality of input video signals from the frame memory at a common output frame frequency,
wherein the common output frame frequency is greater than or equal to a highest frame frequency of the plurality of input video signals; and
a plurality of encoders configured to execute, based on a reference signal at the common output frame frequency, a compression coding operation on the plurality of input video signals that are read from the frame memory.

2. The video processing apparatus according to claim 1, further comprising: a sync status unit configured to monitor at least one frame position and at least one line position of the plurality of input video signals,
wherein the control unit is further configured to:
write the plurality of input video signals into the frame memory based on the monitoring by the sync status unit; and
read the plurality of input video signals from the frame memory based on the monitoring of the sync status unit.

3. The video processing apparatus according to claim 2, wherein the control unit is further configured to:
issue a write instruction, within a first frame, for a second frame at a timing of the common output frame frequency; and
issue a single write instruction in the first frame for a respective video signal of the plurality of input video signals.

4. The video processing apparatus according to claim 2, wherein the control unit is further configured to:
issue a read instruction at a timing of the common output frame frequency; and
prevent issue of the read instruction based on a determination that reading exceeds writing for a respective video signal of the plurality of input video signals.

5. The video processing apparatus according to claim 1, wherein the plurality of encoders are further configured to stop the compression coding operation in an output frame period in which a video signal of the plurality of input video signals is not read from the frame memory.

6. The video processing apparatus according to claim 5, wherein the plurality of encoders are further configured to stop the compression coding operation in the output frame period based on a disable signal.

7. The video processing apparatus according to claim 6, further comprising a timing generator configured to generate the disable signal.

8. The video processing apparatus according to claim 5, wherein the plurality of encoders are further configured to stop the compression coding operation in the output frame period based on a stop of a supply of the reference signal.

9. The video processing apparatus according to claim 1, further comprising: an oscillator configured to generate the reference signal at the common output frame frequency.

10. The video processing apparatus according to claim 1, further comprising: a port configured to input the reference signal at the common output frame frequency.

11. The video processing apparatus according to claim 1, wherein the control unit comprises:
   a first que to save write instructions to write the plurality of input video signals into the frame memory; and
   a second que to save read instructions to read the plurality of input video signals from the frame memory.

12. The video processing apparatus according to claim 1, further comprising a selection unit configured to transmit the plurality of input video signals subjected to the compression coding operation to a storage device in a time division manner.

13. A method for controlling a video processing apparatus comprising:
   temporarily storing a plurality of input video signals in a frame memory;
   writing the plurality of input video signals into the frame memory at respective frame frequencies;
   reading the plurality of input video signals from the frame memory at a common output frame frequency, wherein the common output frame frequency is greater than or equal to a highest frame frequency of the plurality of input video signals; and
   executing, based on a reference signal at the common output frame frequency, a compression coding process on the plurality of input video signals that are read from the frame memory.

* * * * *